United States Patent

Guilfoyle, Sr.

[15] 3,687,499
[45] Aug. 29, 1972

[54] COUPLING DEVICES

[72] Inventor: Edward C. Guilfoyle, Sr., 1501 Miracle Mile #905, Tucson, Ariz. 85705

[22] Filed: Jan. 23, 1970

[21] Appl. No.: 8,762

Related U.S. Application Data

[62] Division of Ser. No. 716,720, March 28, 1968.

[52] U.S. Cl..................287/127 R, 287/125, 287/62
[51] Int. Cl..............................................F16b 13/00
[58] Field of Search........287/125, 2, 117, 62, 127 R, 287/128; 285/397

[56] References Cited

UNITED STATES PATENTS

| | | | |
|---|---|---|---|
| 2,225,333 | 12/1940 | Daniels | 285/397 X |
| 1,797,691 | 3/1931 | Merrill | 285/397 X |
| 1,499,581 | 7/1924 | Kibele | 285/397 X |
| 932,744 | 8/1909 | Adams | 287/125 U |
| 2,356,199 | 8/1944 | Battermann | 287/2 |
| 2,657,944 | 11/1953 | Miller | 287/2 |
| 2,762,639 | 9/1956 | Molter et al. | 287/2 X |
| 2,856,218 | 10/1958 | Helsel | 287/125 |
| 3,176,987 | 4/1965 | Johnston | 287/2 X |
| 3,368,271 | 2/1968 | Scheffler | 287/128 X |

*Primary Examiner*—Andrew V. Kundrat
*Attorney*—Finnegan, Henderson & Farabow

[57] ABSTRACT

A novel alignment element for connecting two tubular members having substantially the same inside diameter is provided. The alignment element comprises a cylindrical member having an outside diameter at one end that can be press fitted into one of the tubular members and an outside diameter at the other end that is slightly smaller to permit a slip fit with the other tubular member. A novel coupler for connecting two tubular members is provided that has end portions each having an outside diameter slightly less than the inside diameter of the tubular member into which they are inserted and a centrally located collar having substantially the same outside diameter as the tubular members.

1 Claim, 13 Drawing Figures

COUPLING DEVICES

This application is a division of application Ser. No. 716,720 filed Mar. 28, 1968.

This invention relates to a support structure to be disposed between two spaced support elements for the suspension of clothes, garment hangers, curtains, or other articles and to means for connecting two tubular members. More particularly, the invention relates to hangers that are horizontally expansible to fit between two support elements of varying horizontal spacing and are vertically adjustable to permit the hanger to extend substantially horizontally between the support elements even when these support elements are at different elevations.

The invention provides a convenient device for suspending articles of clothing and/or garment hangers over a bathtub or shower stall, and embodiments of the invention are illustrated in the drawings that are particularly designed for this use. However, it will be obvious to one skilled in the art that the invention may be used to suspend other articles and that the hanger may be placed in other locations, for example, the invention may be used as a shower curtain rod, as a clothes rod in a clothes closet, or as a brace to hold apart two vertically extending members.

A bathroom, and especially the space above a bathtub or shower enclosure, usually provides a convenient space for drying a small quantity of wet clothes, such as wash-and-wear shirts and synthetic hosiery and undergarments. The water dripping from the clothes does not damage a bathtub or the floor of a shower enclosure and the drying clothes do not present an obstacle to any activity, other than bathing. However, most bathroom walls do not include support elements especially designed for suspending a rod or hanger that may be used to support several garments or garment hangers.

A conventional bathroom is usually provided with a bathtub that is surrounded on three sides by walls; a side wall is located at one side of the tub, and end walls are located at each end of the tub. A conventional bathtub is 5 feet long. As a result, the walls at the ends of the tub are approximately 5 feet apart.

It is common practice to provide the walls about a bathtub with a water-resistant protective surface, such as tile. The tile ordinarily extends about 4 feet above the edge of the tub and terminates along a straight line or edge, although when a shower head is installed above the bathtub, the tile may be extended the entire height of the walls. If the tile does terminate along a straight line above the top of the tub, the upper edge is usually furnished with a quarter-round tile that provides a slightly rounded top surface at the top edge of the protective surface.

The top edge of a tile wall, a shower nozzle together with the water pipe that supplies water to the nozzle, and a shower curtain rod, provide possible support elements for the ends of the bar-like drying rack. However, these possible support elements frequently are positioned at different elevations, and thus a tubular support or bar extended between them would be inclined. The inclination of such a tubular support is disadvantageous because garment hangers may tend to slide together at the lower end of the bar with subsequent bunching together of the garments supported by the clothes hangers. This bunching together of the clothes results in slow drying rates because air can not circulate freely between the garments.

There has been a continuing search for improved support structures that may be installed in bathrooms above a tub or shower enclosure to provide a hanger for suspending wet clothes.

The invention includes an alignment element for connecting two rigid tubular members having substantially the same inside diameter, comprising a cylindrical member including a first end portion having an outside diameter that can be press fitted into one end of a first tubular member so that the alignment element and the first tubular member become an integral structural unit, and a second end portion having an outside diameter that is slightly smaller than the outside diameter of the first end portion to permit the second end portion to be slip fitted into one end of the other tubular member.

The invention further includes a coupler for connecting two rigid tubular sections having substantially the same outside diameter, comprising a cylindrical member with end portions each having an outside diameter slightly less than the inside diameter of the tubular section into which they are to be inserted, and a centrally located collar connecting the end portions, the collar having substantially the same outside diameter as the tubular sections.

The invention resides in the novel parts, constructions, arrangements, combinations, and improvements shown and described.

It is to be understood that both the foregoing general description and the following detailed description are exemplary and explanatory but are not restrictive of the invention.

The accompanying drawings, which are incorporated in and constitute a part of this specification, illustrate embodiments of the invention, and together with the description, serve to explain the principles of the invention.

Figure 1:
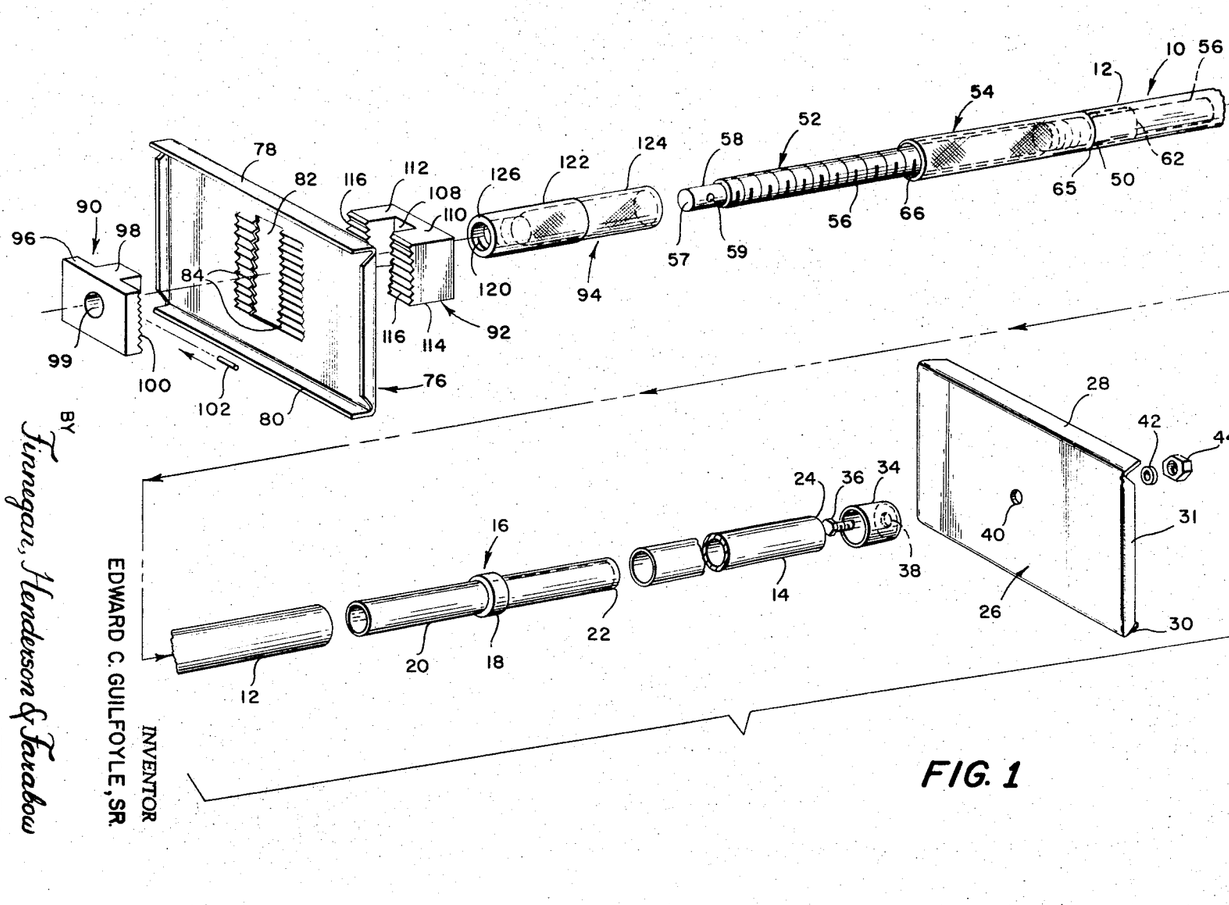
FIG. 1 is an exploded perspective view of one embodiment of the hanger of this invention.
Figures 2, 3, 11:
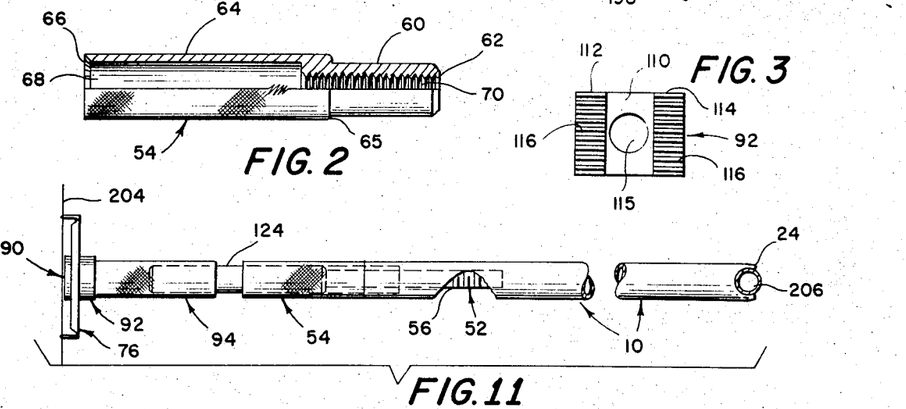
FIG. 2 is a side elevation partly in section of the adjusting nut of the hanger illustrated in FIG. 1.
FIG. 3 is an end elevation of the clamp block of the hanger illustrated in FIG. 1.
FIG. 11 is an elevation view of another embodiment of the hanger of this invention.
Figures 4, 5, 6, 7:
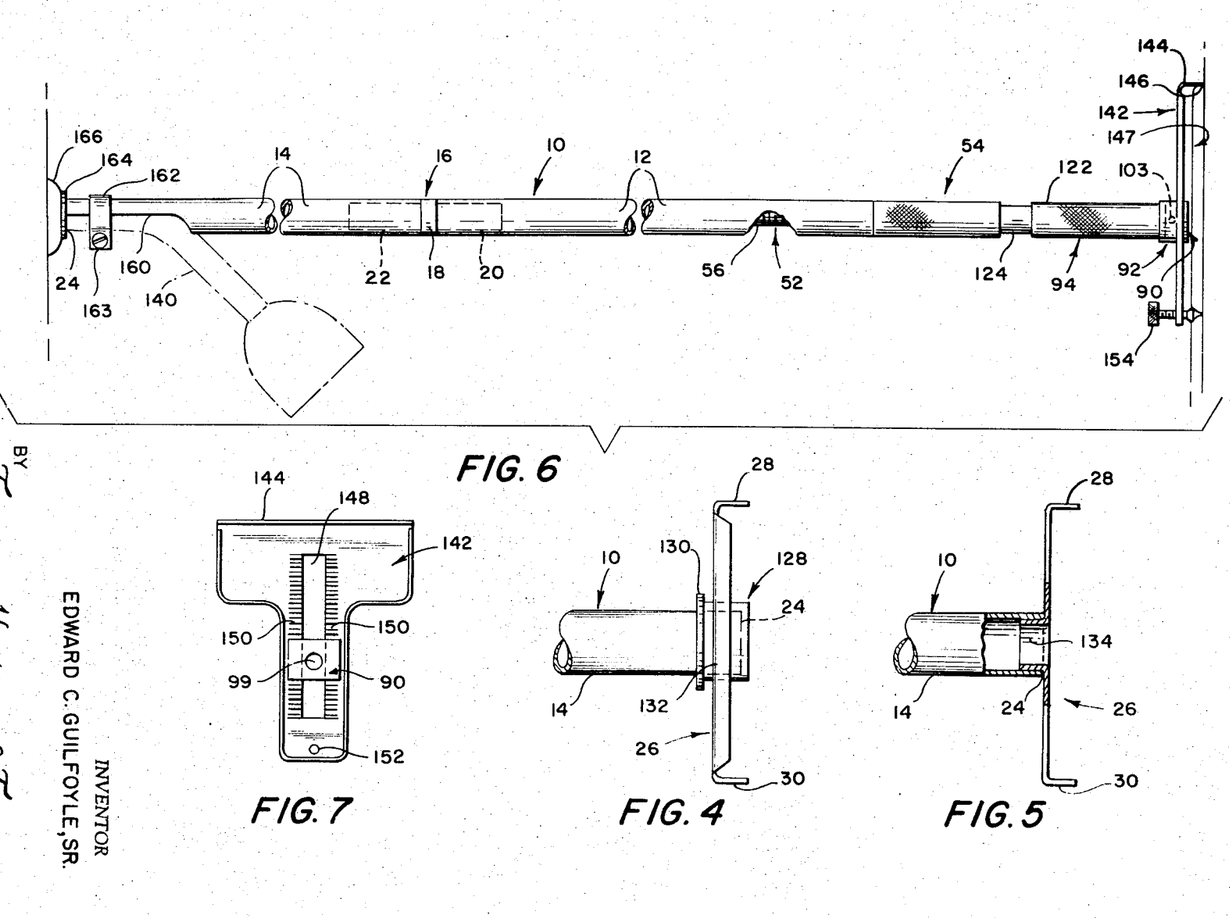
FIG. 4 is a side elevation of another embodiment of an engaging means suitable for use in the hanger of FIG. 1.
FIG. 5 is a side elevation partly in section of another embodiment of an engaging means suitable for use in the hanger of FIG. 1.
FIG. 6 is a side elevation of another embodiment of the hanger of this invention.
FIG. 7 is an end elevation of the hanger plate of the hanger illustrated in FIG. 6.

As shown in FIGS. 1, 6 and 11, the hangers constructed in accordance with this invention are designed for substantially horizontal disposition between two opposed support elements. When attached to and disposed between the support elements, the hanger may be used to suspend garments or garment hangers.

As shown in FIG. 1, the hanger includes a horizontally extending rod. As here embodied, the rod is a tubular member, generally 10, and has an annular cross-section that results in a strong, relatively lightweight member. Tubular member 10 includes a first segment 12 and a second segment 14 that are connected by a hollow coupler generally 16. The coupler is a hollow cylindrical member and includes a central collar 18 that has the same outside diameter as the segments 12 and 14, and connects cylindrical portions 20 and 22 that slide into adjacent end openings of segments 12 and 14, respectively. Thus, segments 12 and 14 and collar 18 form a continuous smooth cylindrical surface when the hanger is assembled. The outside diameter of portions 20 and 22 is slightly less than the inside diameter of segments 12 and 14, respectively, to provide a slip fit.

Coupler 16 provides a convenient device for joining two lengths of tubular material. Its inclusion in the hanger of FIG. 1 allows the easy breakdown and assembly of this structure, a desirable characteristic if it is desired to transport the hanger in a suitcase or the like. It should be noted that coupler 16 is optional, however, and tubular member 10 can be made of a single segment.

In accordance with the invention, an engaging means is mounted on one end of tubular member 10 for engaging a first support element. FIG. 1 illustrates an engaging means which is designed to releasably engage a tiled wall. The term "releasably engage" refers to the removability of the engaging means from the support element after decreasing the overall length of the hanger.

As here embodied and as illustrated in FIG. 1, an engaging mans is provided on one end of tubular member 10 in the form of a pressure plate, generally 26, and means to attach the pressure plate to the tubular member. The pressure plate includes a flanged top edge 28 and a flanged bottom edge 30 that are designed to engage the seams at the top and bottom of a piece of tile in a bathroom wall or the like and bear on the grout cement between the tiles. The pressure plate also includes vertically extending flanges 31 that are optional. Flanges 31 help strengthen the pressure plate, but do not perform any grasping function.

The pressure plate 26 can be connected to one end 24 of the tubular member by a socket cup 34. A screw 36 extends through hole 38 in the socket cup, through an aligned hole 40 in the pressure plate, and is held in place by a washer 42 and nut 44. Screw 36 thus connects the pressure plate and the socket cup.

In accordance with the invention, a length varying means is connected to the other end 50 of tubular member 10 for varying the length of the hanger. As here embodied and as illustrated in FIG. 1, the length varying means comprises a threaded rod, generally 52, that is axially aligned with tubular member 10, and an adjusting nut, generally 54, that is rotatably mounted on the threaded rod.

Threaded rod 52 includes a male threaded portion 56 that engages nut 54 and a smooth portion 58 that extends inwardly from end 57 of the rod. Smooth portion 58 has a diameter slightly smaller than the threaded portion. Preferably, the length of the threaded portion exceeds the length of the smooth portion to allow adjustment of the over-all length of the hanger in a manner that will be described in detail below. It has been found that for a hanger designed to extend approximately 5 feet, a threaded rod of approximately 16 inches over-all length with threaded portion 56 extending about 15 inches provides a desirable length adjustment capability for the hanger.

A hole 59 extends transversely across smooth portion 58 and is spaced from the end 57 of rod 52. Preferably, the hole is circular and its axis falls along a diameter of rod 52. This hole is part of a clamping means which will be described in more detail below.

The length adjusting nut 54 illustrated in FIGS. 1 and 2 has an elongated tubular shape and includes a nose portion 60 that extends inwardly from one end 62, and a raised portion 64 that extends inwardly from the other end 66 of nut 54. Nose portion 60 preferably has an outside diameter slightly smaller than he adjoining inside diameter of tubular member 10 so that the nose portion can be inserted into end 50 of the tubular member and fits snugly in the tubular member. Preferably, the outside diameter of raised portion 64 is about the same as the outside diameter of the tubular member 10 and a shoulder 65 is formed at the juncture of the nose portion and the raised portion. The outer surface of the raised portion is desirably knurled to provide a surface that may be conveniently gripped.

The length adjusting nut 54 includes a passage 68 that extends inwardly from end 66 and a female threaded passage 70 that extends inwardly from end 62. Passage 68 is cylindrical and is sized so that threaded portion 56 of rod 52 does not contact passage 68, and the passage 70 is threaded to engage threaded portion 56 of rod 52.

In accordance with the invention, an adjustable engaging member is mounted on the projecting outer end of the length varying means for engaging a second support element. The adjustable engaging member is mounted on the length varying means to allow vertical movement of the engaging member relative to the outer end of the length varying means and to permit the hanger to extend in a generally horizontal plane, rather than in an inclined plane, between the two support elements even if the support elements happen to be at different elevations.

As here embodied and as illustrated in FIG. 1, the adjustable engaging member comprises a substantially rigid pressure plate, generally 76, for mounting over a piece of tile. The engaging member is releasably mounted on the tile so that the hanger can be easily removed from the tiled wall as will be later described.

The pressure plate includes a flanged top edge 78 and a flanged bottom edge 80 that are designed to engage the seams at the top and bottom of a piece of tile in a bathroom wall or the like and bear on the grout cement between the tiles.

A vertically extending slot 82 is provided in pressure plate 76 so that the pressure plate may be slidably mounted on smooth portion 58 of rod 52 to permit vertical movement of the pressure plate relative to rod 52.

In accordance with the invention, interlock means can be provided on the adjustable engaging means for preventing vertical movement of the pressure plate relative to clamping means, described below. These interlock means cooperate with interlock means on the clamping means as will be more fully described below. As here embodied, the interlock means comprise horizontally extending corrugations 84 that are positioned on each side of slot 82.

In accordance with the invention, clamping means are provided for clamping the adjustable engaging member in a desired vertical and horizontal position relative to the outer end of length varying means. As here embodied and as illustrated in FIG. 1, the clamping means includes an anchor block, generally 90, means for mounting the anchor block on the end of threaded rod 52; a clamp block, generally 92; and a clamp nut, generally 94 for urging the clamp block into frictional contact with the pressure plate.

As here embodied, and as illustrated in FIG. 1, anchor block 90 is T-shaped and includes an end section 96 and a stem section 98 that projects from the end section, with a passage 99 extending the length of the stem section and extending through the end section. The width of the stem section 98 is slightly smaller than the width of slot 82 in pressure plate 76 so that the stem section may be inserted through the slot. The thickness of the end section is made smaller than the horizontal dimension of the flanges 78 and 80 of pressure plate 76 so that end section 96 may be positioned between the pressure plate and a tiled wall. The inside surfaces of the end section includes horizontally extending corrugations 100 that engage the corrugations 84 at the outside surface of the pressure plate 76.

A variety of means may be used to mount anchor block 90 on rod 52. FIG. 1 shows mounting means including a pin 102 that is inserted through holes 103 (best seen in FIG. 6) in the stem section of the anchor block and through the hole 59 in rod 62 after smooth portion 58 of rod 52 is inserted into passage 99 of the anchor block.

The clamp block 92 illustrated in FIGS. 1 and 3 is U-shaped and includes a web portion 110 that connects a pair of sides 112 and 114. A groove 108 is defined by sides 112 and 114 that partially encloses the stem portion 98 of the anchor block when the hanger is assembled. Preferably, the longitudinal and transverse dimensions of the groove are only slightly larger than the length and width, respectively, of stem portion 108 so that the clamp block and anchor block may be urged into snug contact. A passage 115 is provided that extends longitudinally with respect to the assembled hanger across web portion 110 to allow insertion of the smooth portion 58 of rod 52 through web portion 110.

The outer surface of each of sides 112 and 114 include interlock means, such as horizontally extending corrugations 116 that engage the interlock means, corrugations 84, on the pressure plate to prevent vertical movement of the pressure plate relative to the clamp block when the clamp block is urged into frictional contact with the pressure plate.

The clamp nut 94 (best seen in FIG. 1) is provided to urge the clamp block and the pressure plate into frictional contact against the anchor block. The clamp nut has an elongated tubular shape and includes internal threads 120 that engage the threaded portion 56 of rod 52 to permit movement of the clamp nut relative to the rod. The outer surface of the nut includes a raised portion 122 and a recessed portion 124. Raised portion 122 preferably has an outside diameter that exceeds the dimensions of the passage 115 for rod 52 through the web portion 110 of the clamp block so that the outer end 126 of the raised portion bears against the surface of web portion 110. Recessed portion 124 has an outside diameter that is slightly smaller than the inside diameter of passage 68 of adjusting nut 54. Preferably, recessed portion 124 is telescoped into adjusting nut 54 so that threaded portion 56 is protected from abrasion as best shown in FIGS. 6 and 11.

FIGS. 4 and 5 illustrate alternate embodiments of the engaging means that vary from the embodiment of FIG. 1 in the elements used to mount pressure plate, generally 26, on one end 24 of tubular member 10. In FIG. 4, a flanged cup, generally 128, having a peripheral flange 130 is pressed into a hole 132 in the pressure plate. The inside diameter of cup 128 is slightly larger than the outside diameter of the tubular member 10 so that the tubular member may be pressed into the cup.

FIG. 5 shows pressure plate, generally 26, releasably mounted on end 24 of the tubular member by a flanged collar 134 having an outside diameter slightly smaller than the inside diameter of end 24 of member 10. The optional vertically extending flanges 31 of the engaging means of FIG. 1 have been omitted in the embodiment of FIG. 5.

FIG. 6 illustrates a hanger that includes another embodiment of an engaging means and another embodiment of an adjustable engaging member constructed in accordance with the invention. The other elements of the hanger of FIG. 6 are similar to the elements of FIG. 1 and have been given the same numbers.

The engaging means of the hanger of FIG. 6 is particularly designed to engage a pipe 140 that projects from a bathroom wall to a shower nozzle and the adjustable engaging member is designed to engage the top of a surface such as a tile wall. Frequently a tile wall extends up to about the elevation of the shower nozzle, and this specific combination of engaging means and adjustable engaging member is advantageous. However, it would be obvious to one skilled in the art that the use of pressure plate 76 as illustrated in FIG. 1 would be desirable rather than the adjustable engaging member illustrated in FIGS. 6 and 7 if the opposing tile wall is extended a considerable distance above the height of a shower nozzle.

As shown in FIGS. 6 and 7, the vertically adjustable engaging member may comprise a hanger plate, generally 142, having a flanged top 144 that rests on the top surface 146 of a support element, generally 147, such as a tiled wall that has a surface depending therefrom. The pressure plate has a vertically extending slot 148 with a width dimension slightly exceeding the width of the stem section of the anchor block 90 so that the anchor block and rod 52 are slidable in a vertical direction with respect to the hanger plate. Horizontally extending corrugations 150 are provided on each side of the slot to engage the corrugations on the anchor block and the corrugations on the clamp block. A threaded hole 152 is provided at the bottom of the hanger plate so that a swivel foot torque screw 154 may be inserted therethrough. Screw 154 permits the horizontal distance between the depending surface of the support element 147 and the lower end of the hanger plate to be varied. Screw 154 can bear on the end seam, or can bear on the smooth surface of the tile. Preferably the end of the screw 154 is covered with a resilient material such as rubber or nylon to preclude scratching the tile.

The engaging means of FIG. 6 includes collapsed portion 160 at end 24 of the tubular member 10. The collapsed portion may be formed by making a longitudinal cut at the bottom of end 24 of the tubular member 10. The length of the cut would be determined by the distance and angle that the pipe 140 projects from the wall. The cut edges of the tubular member are collapsed inwardly to conform the outer surface of the lower half of the end portion of the tubular member to the upper surface of pipe 140. A clamp 162 that extends over the tubular member 10 and pipe 140 and a screw 163 for securing the clamp are provided to clamp the tubular member to the pipe. Desirably, a washer 164 is provided to prevent the end 24 of tubular member 10 from scoring the wall fixture 166 when the hanger is expanded longitudinally to insure its stability.

Figure 10:
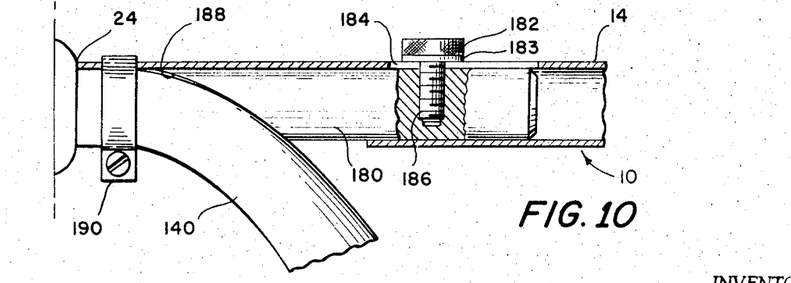
FIG. 10 is a sectional view of another embodiment of the engaging means of FIG. 6 that engages the pipe extending to a shower nozzle.

FIG. 10 illustrates another embodiment of an engaging means that may be used when a water pipe that feeds a shower nozzle is available as a support element. The engaging means of FIG. 10 may be designed to be interchangeable with the engaging means shown in FIG. 6.

In the embodiment of FIG. 10, a portion of tubular member 10 is cut-away at end 24 so that the tubular member may be seated on the curving pipe 140. The engaging means of FIG. 10 comprise a longitudinally extending plug 180 that is inserted in end 24 of the tubular member and is slidable therein. A clamp screw 182, that fixes the position of the plug, extends through a washer 183, through a longitudinally extending slot 184 in tubular member 10, and into a threaded hole 186 in the plug. The outer end of the plug includes a concave surface 188 that may be positioned to bear on the convex upper surface of the pipe 150 by sliding the plug along the tubular member 10 and by adjusting clamp screw 182. Desirably, a clamp 190 extends over the tubular member 10 and the pipe 140 adjacent to the end of the tubular member to clamp the tubular member on pipe 140.

Figure 8:
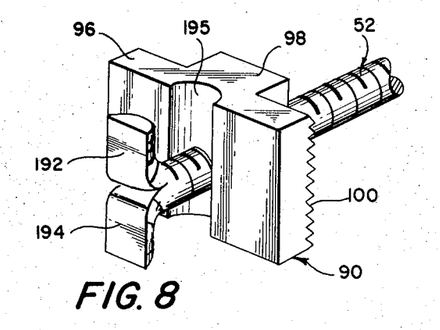
FIG. 8 is a perspective view of another embodiment of the means for fixing the position of the anchor block of the hanger of FIGS. 1 and 6.
Figure 9:
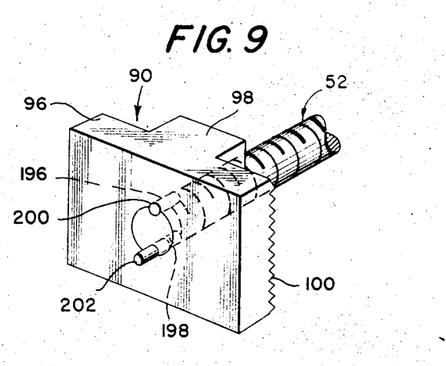
FIG. 9 is another embodiment of means for fixing the position of the anchor block of the hangers of FIGS. 1 and 6.

FIGS. 8 and 9 illustrate other embodiments of means for mounting the anchor block 90 on the rod 52. In these embodiments, rod 52 is threaded throughout its length. FIG. 8 shows a pair of abutments 192 and 194 that are formed by splitting and bending the projecting end of threaded rod 52. Preferably, a groove 195 is provided in the outer surface of the anchor block which seats the abutments 192 and 194 and the anchor block does not include holes 103 through its stem section 98. In other respects the anchor block of FIG. 8 is similar to the anchor block of FIGS. 1 and 6.

In the embodiment of FIG. 9, a pair of grooves are formed in the passage of the anchor block and a pair of grooves are formed at the projecting end of threaded rod 52. The groove in the anchor block and the groove in the rod are aligned to form a pair of keyways 196 and 198 to allow insertion of a pair of roll pin keys 200 and 202. The passage in anchor block 90 is threaded to cooperate with the keys to fix the anchor block on the end of rod 52. The anchor block of FIG. 9 resembles the anchor block of FIGS. 1 and 6 with the exception that the grooves are provided in the anchor block of FIG. 9 rather than holes 113 in the stem section, and the passage is threaded.

FIG. 11 illustrates an embodiment of the invention that may be suspended above a bathtub or shower enclosure from a tiled wall 204 to a shower curtain rod 206. This embodiment of the invention is similar to the embodiment illustrated in FIG. 1 except that the engaging means of FIG. 11 are designed to engage a shower curtain rod. The corresponding elements of FIGS. 1 and 11 have the same numbers.

In FIG. 11, end 24 of the tubular member 10 forms the engaging means for engaging the rod 206. The engaging means illustrated in FIG. 11 at end 24 comprise a semi-circular cut-out in the end 24 of tubular member 10. The cut-out end of the tubular member forms a bracket that conforms to the shape of the adjacent portions of the cross-section of the curtain rod 196.

Figures 12, 13:
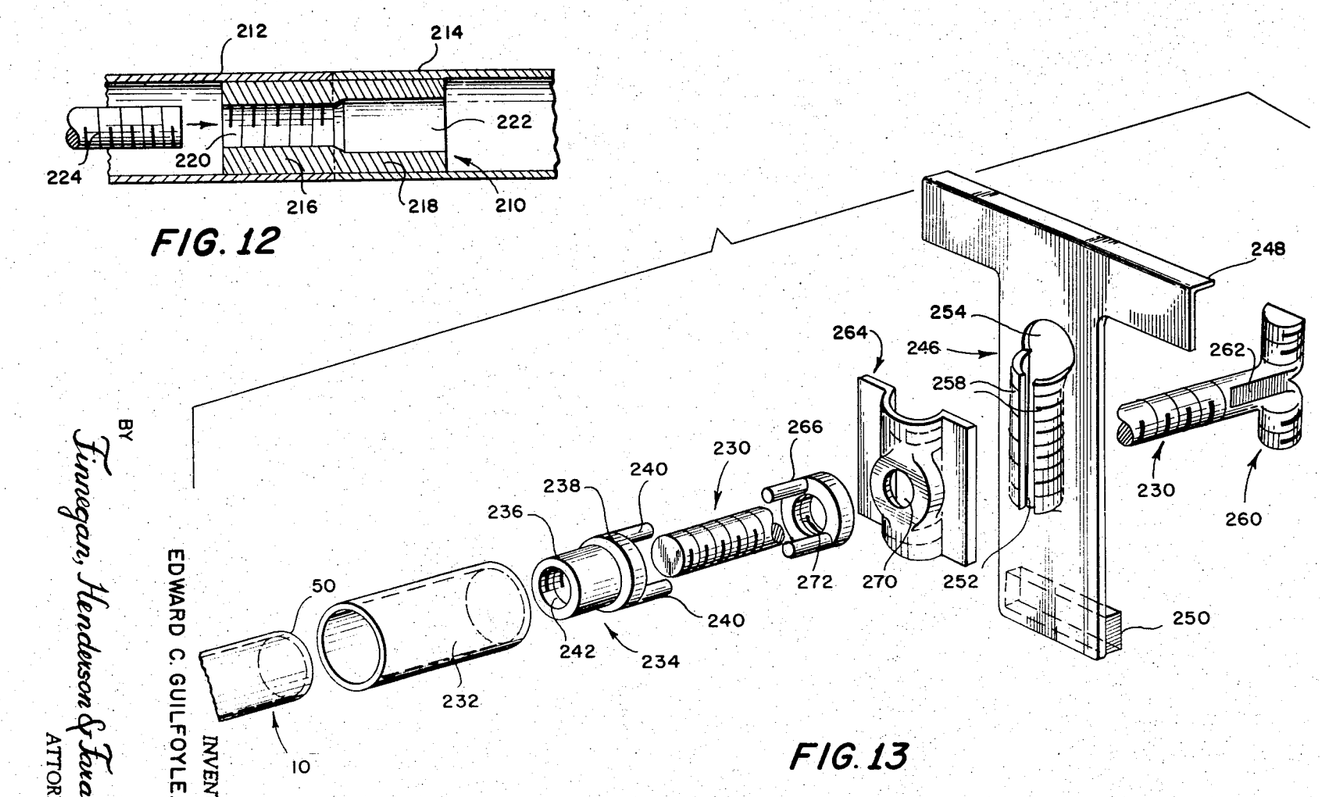
FIG. 12 is a side elevation in section of an alignment element constructed in accordance with the invention.
FIG. 13 is an exploded perspective view of another embodiment of the adjustable engaging member, length varying means, and the clamping means of the hanger of this invention.

An alignment element, generally 210, for connecting two tubular members 212 and 214 having substantially the same inside diameter is illustrated in FIG. 12. Alignment element 210 is a hollow cylindrical member and includes a pair of end portions, end portion 216, and end portion 218 that has an outside diameter slightly less than end portion 216. The outside diameter of end portion 216 is selected to produce deformation and stressing of tubular member 212 when end portion 216 is press fit into tubular member 212. Consequently, it is desirable that end portion 216 have an outside diameter at least as large as the inside diameter of tubular member 212. The alignment element and tubular member 212 become an integral structural unit when press fit together. End portion 218 which has a smaller outside diameter than end portion 216 is slip fit into tubular member 214.

Alignment element 210 includes a central passage having a threaded portion 220 and a larger smooth portion 222 to allow passage of a threaded rod 224 therethrough. When tubular member 212 is rotated relative to rod 224, alignment element 210 engages rod 224 and tubular member 212 is moved longitudinally with respect to rod 224.

It should be noted that alignment element 210 and a relatively short tubular member 212, when press fit together, could be used as the length adjusting nut 54 or the clamp nut 94 of FIGS. 1, 6, and 11.

FIG. 13 illustrates alternate embodiments of the length varying means, the adjustable engaging member, and the clamping means of FIGS. 1, 6, and 11. The adjustable engaging member of FIG. 13 may be used to engage the top edge of a smooth or a tiled wall.

The length varying means of FIG. 13 includes a threaded rod, generally 230, a sleeve 232, and a length adjusting nut, generally 234. Nut 234 includes a nose portion 236, and a raised portion 238 with arms 240 extending therefrom that support sleeve 232. A threaded passage 242 to permit the engagement of threaded rod 230 extends longitudinally through nut 234. Nose portion 236 is inserted into end 50 of tubular member 10.

Sleeve 232 is provided to slip over raised portion 238 and arms 240 to prevent abrasion of rod 230. The inside diameter of sleeve 232 is also made large enough to slide over end 50 of tubular member 10.

The adjustable engaging member, hanger plate generally 246, of FIG. 13 includes a flanged top edge 248 designed to bear on the top surface of a support element and a bearing surface 250 positioned at the lower portion of the hanger plate. Bearing surface 250 is preferably made of a resilient material such as rubber or plastic that will not mar a wall surface.

Hanger plate 246 includes a vertically extending slot 252 and a hole 254 positioned above the slot. Portions of hanger plate 246 positioned adjacent slot 252 are curved inwardly to form curved strips 258 that have the same degree of curvature as the adjacent portion of the anchor block. Thus, strips 258 permit a large contact area between an anchor block (described below) and hanger plate 246.

Strips 258 include horizontal corrugations that cooperate with the clamping means to prevent vertical movement of rod 230 relative to hanger plate 246 when the hanger is assembled.

The clamping means illustrated in FIG. 13 includes an anchor block, generally 260, formed by splitting and bending the projecting end of rod 230. A flat indentation 262 is provided on each side of rod 230 adjacent the longitudinal end of the rod to permit rod 230 to slide in slot 252 after the rod has been inserted through hole 254.

The clamping means also include clamp block, generally 264, and clamp nut 266 having projecting arms that help support sleeve 232. Clamp block 264 has a horizontally corrugated concave surface that engages strips 258 on hanger plate 246. A central passage 270 is provided to permit mounting the clamp block on rod 230. Clamp nut 266 includes a threaded passage 272 that engages threaded rod 230.

A procedure for the installation of the expansible tubular hanger of FIG. 1 between a pair of opposed tiled walls will now be described. In general, the order of assembly of the elements is not critical and the following procedure is merely representative.

The end 57 of rod 52 is inserted through clamp nut 94 with the threaded portion 56 of the rod engaging the threaded passage 120 of the clamp nut, through passage 115 of clamp block 92, through slot 82 of pressure plate 76, and into passage 99 of anchor block 90. The hole 59 in rod 52 is subsequently aligned with holes 103 in stem section 98 of the anchor block 90 and pin 102 is inserted through the aligned holes to fix the position of the anchor block relative to the adjacent end 57 of rod 52. The clamp nut 94 is now in position to urge the clamp block 92 and the pressure plate 76 towards the anchor block 90.

The segments 12 and 14 of tubular member 10 are connected by inserting cylindrical portions 20 and 22 of coupler 16 into the adjacent ends of the segments.

The pressure plate 26, with socket cup 34 attached to the plate by screw 36 and nut 44, may be mounted on end 24 of tubular member 10 by inserting the tubular member into the socket cup.

The rod 52 is telescoped into adjusting nut 54, and the threaded passage 70 of the adjusting nut and threaded portion 56 of rod 52 are engaged by rotating the adjusting nut. Telescoping rod 52 into adjusting nut 54 reduces the overall length of the hanger to permit insertion of the assembled hanger between the opposing wall surfaces. Subsequent longitudinal expansion of the hanger is attained by rotating the adjusting nut towards pressure plate 26.

After the elements of the hanger are assembled, the hanger is ready for disposition between two opposing support elements such as tiled walls. Pressure plate 26 is preferably positioned over a tile in one wall with its flanged top and bottom edges engaging the seams at the top and bottom of the tile. Adjustable pressure plate 76 at the other end of the hanger is then positioned over a tile in the other wall with its flanged top and bottom edges engaging the seams at the top and bottom of the tile and resting on grout cement. Adjustment of the overall length of the hanger by rotation of adjusting nut 54 may be necessary before pressure plate 76 can be positioned over a tile. If the hanger is to be lengthened, the nut is rotated to move it towards pressure plate 26, if the hanger is to be shortened, the nut is rotated to move it towards the pressure plate 76 and tubular member 10 is subsequently manually further telescoped over nose 60 of nut 54.

Because the rows of tile on one wall may not be at exactly the same elevation as the rows of tile in the other wall, it is desirable to align tubular member 10 in a horizontal plane by sliding the end 57 of rod 52 in slot 82 of pressure plate 76 to adjust the elevation of the end of the rod to approximately the elevation of end 24 of tubular member 10. During this horizontal adjustment of the tubular member, the end 126 of clamp nut 94 is positioned a distance from pressure plate 76 that is sufficient to permit spacing of the clamp block and the anchor block from the pressure plate. After the tubular member 10 is horizontally positioned by sliding the end of rod 52 to the desired elevation, the clamp nut 94 is rotated to move it towards the anchor block and to urge the clamp block 92, pressure plate 76, and anchor block 90 into frictional engagement. The corrugations 100 on the anchor block and the corrugations 116 on the clamp block engage the corrugations 84 on the pressure plate to preclude vertical movement of end 57 of rod 52 when the clamp nut 94 is rotated to force these elements into engagement.

The assembly of the elements of the hanger of FIG. 6 may follow the assembly procedure described above. The installation of the hanger of FIG. 6 is described below. The engaging means at end 24 of the tubular member are positioned to engage pipe 140. The collapsed portion of the tubular member is placed on top of the pipe and clamp 162 is extended over the tubular member and the pipe and secured by the screw 163.

Subsequently, the hanger plate 142 is positioned with its top edge 144 on the top surface 146 of the support element 147. Torque screw 154 is then rotated to adjust the distance between the lower end of the hanger plate and support element 147 so that the hanger plate is placed in an approximately vertical position. After the hanger plate is positioned, the tubular member is horizontally aligned using a procedure similar to that outlined for the hanger of FIG. 1.

The assembly of the structure of FIG. 13 may be initiated by inserting rod 230 through hole 254 in hanger plate 246 and passage 270 in clamp plate 264 and into engagement with threaded passage 272 of clamp nut 266 and threaded passage 242 of adjustment nut 234. Once inserted through hole 254, the flat indentations 262 allow the end of rod 230 to slide down into slot 252. When anchor block 260 is moved into abutting contact with strips 258, the corrugations on the anchor block and the strips interlock to prevent vertical movement of rod 230 in relation to hanger plate 246.

Sleeve 232 is positioned over the adjusting nut and the clamp nut and prevents abrasion of rod 230.

The remainder of the assembly operations are similar to the procedure outlined above for the hanger of FIG. 1 and the installation procedure is similar to that described above for the structure f FIG. 6.

The assembly and installation of the hanger of FIG. 11 is similar to the assembly and installation of the hanger of FIG. 1 with the exception that the engaging means of FIG. 11, the bracket formed at the end 24 of the tubular member, is positioned to engage a shower curtain rod rather than a tile.

Removal of the hangers of FIG. 1 from the site of installation may be accomplished by first rotating length adjusting nut 54 to move it towards the clamp block 92. Tubular member 10 and pressure plate 26 will be moved away from the support element by movement of the adjusting nut 54 if the nose portion 60 of adjusting nut 54 fits snugly in end 50 of tubular member 10 and end 24 of tubular member 10 fits snugly in socket cup 34. If these elements are loosely connected, it may be necessary to move the end 50 of tubular member 10 towards end 62 of adjusting nut 54 prior to disengaging the pressure plates 26 and 76 from the tile wall. In either situation, the overall length of the hanger is reduced and the engaging means, pressure plate 26, and the adjustable engaging member, pressure plate 76, may be removed from their respective support elements, the tiled walls.

The removal of the hangers of FIGS. 6, 11, and 13 is initiated in a similar fashion.

Although removal of the hangers of this invention from a site of installation is a relatively simple procedure, it should be noted that this removal would seldom be necessary. Hangers constructed in accordance with the invention can be positioned at a sufficient elevation so that they do not present an obstacle to bathing when installed above a tub or shower enclosure.

The hanger of the present invention may be made of a variety of materials such as metal or plastic and combinations of metals and plastics. Preferably, the materials used in the construction of the hanger are not deleteriously affected by water and air, or may be coated to satisfactorily resist corrosion by water and air.

The invention provides a new and improved expansible hanger that is capable of horizontal disposition between a pair of support elements that may be located at different elevations, that is removable after being installed, and that may be broken down so that the device may be transported in a suitcase or the like.

It will be apparent to those skilled in the art that various modifications and variations could be made in the expansible tubular hanger without departing from the scope or spirit of the invention. For example tubular member 10 could be made in one piece if it was not desired to provide a hanger than can be broken down for case of transportation and storage.

The invention in its broader aspects is not limited to the specific details shown and described, but departures may be made from such details within the scope of the accompanying claims without departing from the principles of the invention and without sacrificing its chief advantages.

What is claimed is:

1. An improved coupling for connecting a pair of tubular members comprising:
   a. first and second rigid tubular members having substantially the same inside diameter;
   b. a threaded rod protruding axially into the interior of one of said tubular members and connected to an external member longitudinally spaced from the adjacent ends of said tubular members;
   c. a generally cylindrical alignment element including a first end portion having an outside diameter that is press fitted into one end of said first tubular member so that the alignment element and the first tubular member comprise an integral structural unit, and a second end portion having an outside diameter that is slightly smaller than the inside diameter of said first end portion and slip fitted into the adjacent end of the second tubular member; said cylindrical alignment element including a hollow threaded portion extending along the axis of said alignment element, said threaded portion engaging one end of said threaded rod and thus permitting longitudinal movement of said first and second tubular members relative to said threaded rod when said first tubular member is rotated in one direction about its axis, and longitudinal movement of said first tubular member relative to said threaded rod and said second tubular member when said first tubular member is rotated in an opposite direction about its axis.

* * * * *